US012236329B2

(12) United States Patent
Zadrozny et al.

(10) Patent No.: US 12,236,329 B2
(45) Date of Patent: Feb. 25, 2025

(54) ESTIMATE ORE CONTENT BASED ON SPATIAL GEOLOGICAL DATA THROUGH 3D CONVOLUTIONAL NEURAL NETWORKS

(71) Applicant: INTERNATIONAL BUSINESS MACHINES CORPORATION, Armonk, NY (US)

(72) Inventors: Bianca Zadrozny, Rio de Janeiro (BR); Helon Vicente Hultmann Ayala, Rio de Janeiro (BR); Breno William Santos Rezende de Carvalho, Rio de Janeiro (BR); Daniel Salles Chevitarese, Rio de Janeiro (BR); Daniela de Mattos Szwarcman, Rio de Janeiro (BR); Lucas Correia Villa Real, Sao Paulo (BR); Marcio Ferreira Moreno, Rio de Janeiro (BR); Paulo Rodrigo Cavalin, Rio de Janeiro (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1279 days.

(21) Appl. No.: 16/122,859

(22) Filed: Sep. 5, 2018

(65) Prior Publication Data

US 2020/0074270 A1 Mar. 5, 2020

(51) Int. Cl.
*G06N 3/04* (2023.01)
*G01V 20/00* (2024.01)
*G06N 3/08* (2023.01)

(52) U.S. Cl.
CPC ............... *G06N 3/04* (2013.01); *G01V 20/00* (2024.01); *G06N 3/08* (2013.01)

(58) Field of Classification Search
CPC .......... G06N 3/04; G06N 3/08; G06N 3/0454; G01V 99/005
See application file for complete search history.

(56) References Cited

U.S. PATENT DOCUMENTS 8,849,622 B2 9/2014 Melkumyan et al.
9,916,539 B2 3/2018 Silversides et al.
(Continued)

FOREIGN PATENT DOCUMENTS

CN 102609986 B 5/2014
RU 2383889 C1 3/2010
(Continued)

OTHER PUBLICATIONS

Wu, J. (2017). Introduction to convolutional neural networks. National Key Lab for Novel Software Technology. Nanjing University. China, 5(23), 495. (Year: 2017).*

(Continued)

*Primary Examiner* — Luis A Sitiriche
(74) *Attorney, Agent, or Firm* — Intelletek Law Group, PLLC; Gabriel Daniel, Esq.

(57) ABSTRACT

An ore content prediction system is provided. The system receives structured geological data that is derived based on spatial geological information that is associated with an input region. The received structured geological data includes a plurality of multidimensional tensors that are derived from spatial geological information of a plurality of sub-regions of the input region. The spatial geological information includes one or more types of data. The system trains a prediction model to produce a prediction output based on an average grade of an ore of a target mineral type at a target region by using the received structured geological data. The system identifies a relationship of the structured geological data to the prediction output and determines a revised input region based on the identified relationship.

20 Claims, 9 Drawing Sheets

(56) References Cited

U.S. PATENT DOCUMENTS

| | | | |
|---|---|---|---|
| 9,970,266 B2 | 5/2018 | Marx et al. | |
| 2012/0210783 A1* | 8/2012 | Carroll | G01V 7/00 |
| | | | 73/382 G |
| 2014/0288838 A1* | 9/2014 | Trickett | G01V 1/364 |
| | | | 702/14 |
| 2016/0299243 A1* | 10/2016 | Jin | G01V 1/303 |
| 2020/0160173 A1* | 5/2020 | Pandey | G01V 99/005 |

FOREIGN PATENT DOCUMENTS

| | | |
|---|---|---|
| WO | 2014/134655 A1 | 9/2014 |
| WO | 2018/137893 A1 | 8/2018 |

OTHER PUBLICATIONS

Kapageridis, I., & Denby, B. (1998). Ore grade estimation with modular neural network systems—a case study. Information Technology in the Mineral Industry. Edited by GN Panagiotou and TN Michalakopoulos. AA Balkema Publishers, Rotterdam, 52. (Year: 1998).*

Setiono, R., & Liu, H. (1997). Neural-network feature selector. IEEE transactions on neural networks, 8(3), 654-662. (Year: 1997).*

Wang, T., Huan, J., & Li, B. (Sep. 1, 2018). Data dropout: Optimizing training data for convolutional neural networks. arXiv e-print. arXiv:1809.00193v1 (Year: 2018).*

Kapageridis, I. K. et al., "Neural Network Modelling of Ore Grade Spatial Variability"; University of Nottingham, Nottingham, United Kingdom; (Date: unknown); 6 pgs.

Jafrasteh, B. et al., "A Hybrid Simultaneous Perturbation Artificial Bee Colony and Back-Propagation Algorithm for Training a Local Linear Radial Basis Neural Network on Ore Grade Estimation"; Neurocomputing (2017); 3 pgs.

Matias, J.M. et al., "Comparison of Kriging and Neural Networks with Application to the Exploitation of a Slate Mine"; Mathematical Geology (2004); vol. 36:4; pp. 463-486.

Koike, K. et al., "Neural Network-Based Estimation of Principal Metal Contents in the Hokuroku District, Northern Japan, for Exploring Kuroko-Type Deposits"; Natural Resources Research (2002); vol. 11:2; pp. 135-156.

Samanta, B. et al., "Construction of a Radial Basis Function Network Using an Evolutionary Algorithm for Grade Estimation in a Placer Gold Deposit"; Computers & Geosciences (2009); vol. 35; pp. 1592-1602.

Li, X et al., Hybrid Self-Adaptive Learning Based Particle Swarm Optimization and Support Vector Regression Model for Grade Estimation; Neurocomputing (2013); vol. 118; pp. 179-190.

Mell, P. et al., "Recommendations of the National Institute of Standards and Technology"; NIST Special Publication 800-145 (2011); 7 pgs.

Cintra, E.C., Aplicação De Redes Neurais No Controle De Teores De Cobre E Ouro Do Depósito De Chapada(GO); Universidade Estadual Paulista; Sao Paulo, Brazil (2003); 171 Pgs (Part 1, 58 pgs).

Cintra, E.C., Aplicação De Redes Neurais No Controle De Teores De Cobre E Ouro Do Depósito De Chapada(GO); Universidade Estadual Paulista; Sao Paulo, Brazil (2003); 171 Pgs (Part 2, 57 pgs).

Cintra, E.C., Aplicação De Redes Neurais No Controle De Teores De Cobre E Ouro Do Depósito De Chapada(GO); Universidade Estadual Paulista; Sao Paulo, Brazil (2003); 171 Pgs (Part 3, 57 pgs).

* cited by examiner

ESTIMATE ORE CONTENT BASED ON SPATIAL GEOLOGICAL DATA THROUGH 3D CONVOLUTIONAL NEURAL NETWORKS

BACKGROUND

Technical Field

The present disclosure generally relates to systems and methods for processing geological data to estimate ore content.

Description of the Related Art

In order to identify ore bodies in an underground mine that are worthy drilling targets, geologists use spatial geological information from different sources such as drill hole measured information, maps of visible geological structure in drifts (tunnels), and assay lab results to justify their decisions. The amount of information available regarding an underground mine is often massive, and the task of interpreting the information is subjective and requires many hours from individuals with expert knowledge. Furthermore, some of the required expert knowledge is specific to each mining project, because each underground mining has its own unique geology.

SUMMARY

Some of embodiments of the disclosure provide an ore content prediction system. The system receives structured geological data that are derived based on spatial geological information that is associated with an input region. In some embodiments, the received structured geological data includes a plurality of multidimensional tensors that are derived from spatial geological information of a plurality of sub-regions of the input region. The system trains a prediction model to produce a prediction output based on an average grade of an ore of a target mineral type at a target region by using the received structured geological data. The system identifies a relationship of the structured geological data to the prediction output. The system determines a revised input region based on the identified relationship.

In one embodiment, the ore content prediction system specifies an inquiry region and receives structured geological data that are derived based on spatial geological information that associated with the inquiry region The system applies the trained prediction model to the received structured geological data to generate a prediction output based on an average grade of an ore of a target mineral type at a target region within the inquiry region. The system may also suggest a modified inquiry region based on the trained prediction model and the specified inquiry region and receive structured geological data that are derived based on spatial geological information that is associated with the modified inquiry region. The system then applies the trained prediction model to the received structured geological data to generate a prediction output based on an average grade of an ore of the target mineral type at a target region within the modified inquiry region.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in. the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide an ore content prediction system. The system generates insights based on patterns present in spatial geological information. The system leverages multiple different types of geological measurements to classify ore versus waste. The system uses data-driven predictive modeling to represent relationships among geological data which can then be used to check novel regions to improve mining outcomes. In some embodiments, the system estimates content of an ore based on spatial geological information surrounding a target region obtained from drill holes and/or drift maps, such as assay value information, lithology information, veining information, and various structural information. The system converts the drill hole data into multidimensional arrays to computationally represent the spatial geological information surrounding the target region. A machine learning model (such as a convolutional artificial neural network) takes the multidimensional arrays as input to generate a prediction output value. The prediction output value represents an average grade of an ore at the target region. The prediction output value is obtained from assay values information, which is also used to identify the relationships present in the geological data.

Figure 1:
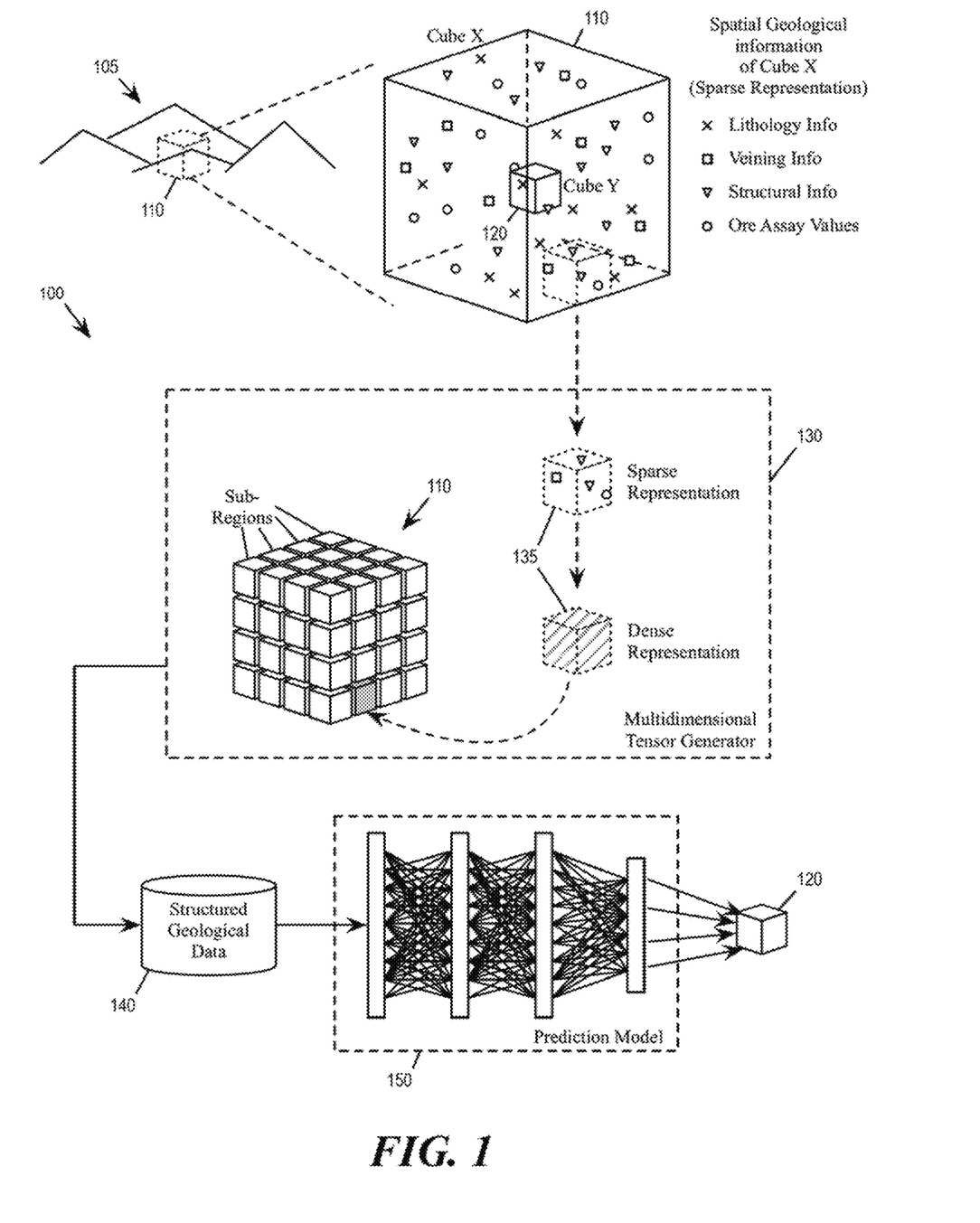
FIG. 1 illustrates an ore content prediction system, consistent with an exemplary embodiment.

FIG. 1 illustrates an ore content prediction system 100, consistent with an exemplary embodiment of the disclosure. The system receives various types of spatial geological information regarding a mining location 105 and predicts ore content at the mining location based on the received spatial geological information. The spatial geological information that falls within an input region 110 of the mining location 105 is used by the system as input to predict the ore content of a target region 120. The output of the prediction is a value that reflects the average grade of the ore in the target region 120.

In some embodiments, the input region and the target region are three dimensional volumes of a particular shape. In some embodiments, the input region 110 is a cube (cube X) that surrounds the target region 120, and the target region 120 is a cube (cube Y) at the centroid of the input region 110. The input region and the target region can also have other shapes, such as a platonic solid or a sphere. The size of the input region cube is related to the spatial correlation of the geological structure at the mining location 105, more specifically, to how far a certain piece of geological information might affect ore presence in a certain location.

The spatial geological information that is used as input to predict the ore content is information known to affect the chance of ore mineralization. The spatial geological information may include several different types of information, such as lithology, veining, alteration and structure information (such as faults and folds), as well as known ore assay values. The spatial geological information used to predict the ore content of the target region 120 is information associated with or is taken from the input region 110, such as samples taken from drill holes that fall within input region 110. In the figure, these various different types of geological information of the input region 110 are illustrated by different symbols (Xs, circles, squares, and triangles). Each symbol at a spatial position corresponds to spatial geological information of the corresponding type that is obtained at that spatial position (by e.g., drill holes or drift maps).

The system 100 includes a multidimensional tensor generator 130 that transforms the spatial geological information into matrices as input to predict ore content. In some embodiments, the multidimensional tensor generator 130 formats or transforms the spatial geological information in the input region into a multidimensional matrix or tensor representation. In the representation, the different types of geological data are convened into different scalar components of the matrix or tensor. The transformation of the spatial geological information converts the geological information from a sparse representation in which the spatial geological information is tied to specific points in space, into a dense representation in which the spatial geological information is applicable to regions in space. In some embodiments, the dense representation is a 3-dimensional matrix with order N×M×P that describes the overall geological structure surrounding a point in space.

In some embodiment, the input region 110 is divided into smaller sub-regions (illustrated as smaller cubes). The spatial geological information that falls within a sub-region (e.g., a smaller cube 135) is processed together to generate the multidimensional matrix or tensor representation of the sub-region in a dense representation. The size of the matrices is based on the granularity of the tensor representations as well as the number of geological variables that are used.

The generated matrices or tensors are stored as structured geological data 140, which may be a physical storage device or a cloud storage. The structured geological data 140 is in turn used as input by a prediction model 150 to produce a prediction output value. When provided with the structured geological data 140, which includes generated matrices or tensors of the various sub-regions of the input region 110, the prediction model 150 produces a prediction output value that corresponds to an average grade of the ore at the target region 110.

The prediction model 150 is a machine learning model that can be trained by the available spatial geological information from drill holes and drift. Spatial geological information from different positions in and around the mining location 105 with known grades of the minerals (e.g., assay values) are used to construct input-output pairs as training examples to train the prediction model 150. The prediction model 150 may include a deep neural network that can take 3-dimensional (3D) images as input, such as a 3D convolutional neural network (3D-CNN).

To train the prediction model 150 to predict ore content for a particular type of mineral (e.g., gold), the ore content prediction system 100 may be configured to (i) identify positions in the mining location 105 as having known assay values for a target mineral type, (ii) define a target region for each of the identified positions, and (iii) use the spatial geological information of the corresponding input region of each defined target region to train the prediction model 150.

Figure 2:
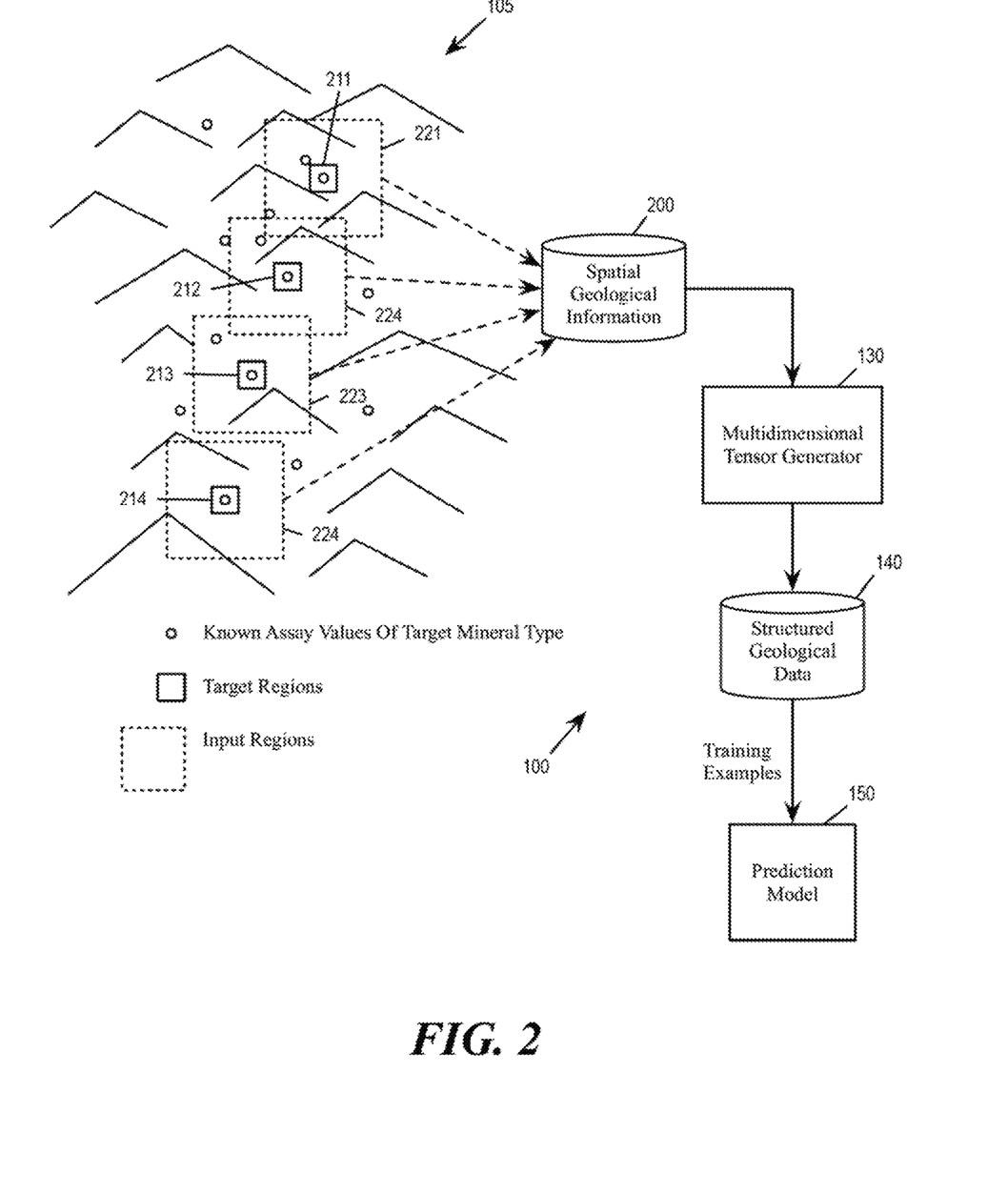
FIG. 2 conceptually illustrates using positions with known assay values to train the prediction model of the ore content prediction system.

FIG. 2 conceptually illustrates using, positions with known assay values to train the prediction model of the ore content prediction system 100. As illustrated, the system 100 receives spatial geological information 200, which is taken from drill holes and drift maps of the mining location 105. The system identifies positions with known assay values of the target mineral type. (The positions having known assay values of the target mineral type are illustrated with circles). For some of the positions with known assay values, the system 100 has defined target regions 211-214. The system 100 has also defined input regions 221-224 to respectively surround the target regions 211-214. Spatial geological information collected from drill holes and drift maps that fall within the input regions 221-224 are used as training examples for the prediction model 150 along with the assay values of the target regions 211-214. (The target regions 211-214 and input regions 221-224 are conceptually illustrated as two-dimensional squares, but one of ordinary skill would understand that the target regions and input regions can be three-dimensional volumes such as cubes.) The spatial geological information used as training examples are converted into tensors by the multidimensional tensor generator 130 and stored as the structured geological data 140 for use by the prediction model 150.

The amount of spatial geological information collected for a given mining area can be enormous. This makes training the prediction model 150 extremely time consuming. However, the time required to train prediction model can be significantly reduced if the geological information used to train the prediction model is limited to those that are most likely to be relevant to the prediction outcome. One way to improve training efficiency is to set the input region (e.g., 110) to include only spatial geological information that is more likely to be relevant. In some embodiments, the ore content prediction system 100 provides a user interface that allows the user of the system to set the input region, presumably based on the user's own expert knowledge. In some embodiments the ore content prediction system 100 analyzes the training result of the prediction model and suggest an input region that is more likely to include relevant geological information than a randomly chosen input region.

Figure 3A:
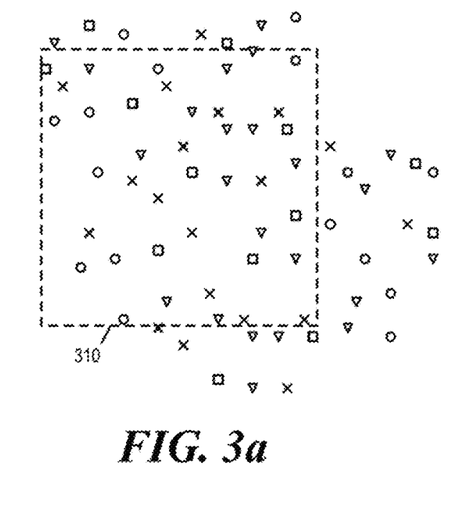
FIGS. 3*a*, 3*b*, and 3*c* conceptually illustrate the ore content prediction system suggesting an input region based on analysis of the geological information.
Figure 3B:
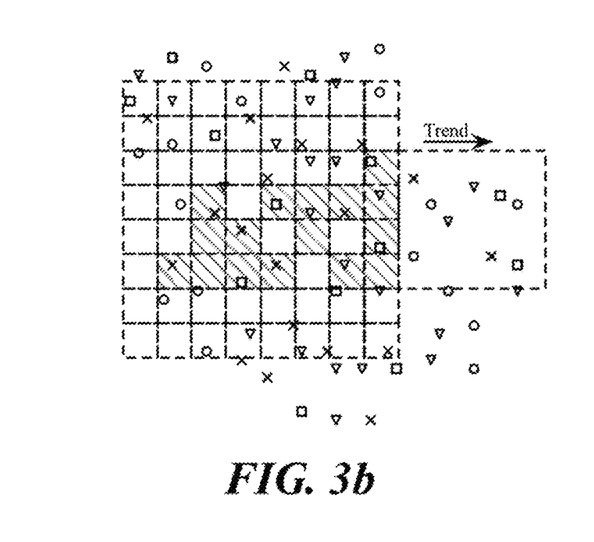
Figure 3C:
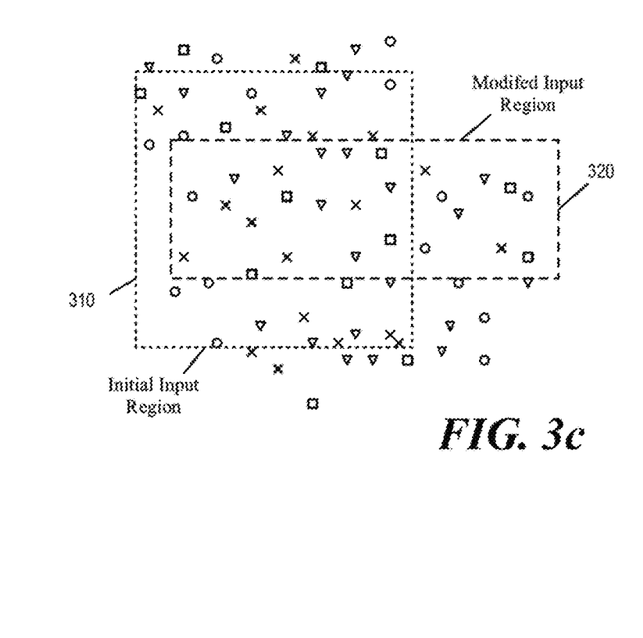

FIGS. 3a, 3b, and 3c conceptually illustrate the ore content prediction system suggesting an input region based on analysis of the ecological information. The figures illustrate a geological information that is associated with different spatial positions in a mining location. Some of the geological information is known assay values of the targeted mineral.

FIG. 3a illustrates an initial input region 310 that encompass some of the available ecological information. The ore content prediction system 100 may set the initial input region by defining a region of a particular 3D shape such as a cube. The system 100 may define the size of the initial input region based on the amount of available geological information or some other criteria. The system 100 may also let the user set the initial input region 310 through the user interface of the system 100. Based on the initial input region 310, the system 100 performs an analysis of the geological information that falls within the initial input region. In some embodiments, the analysis is part of the training process for the prediction model 150.

FIG. 3b illustrates the result of the analysis of the initial input region 310. The analysis identifies structured geometric data that is mathematically related, i.e., the sub-regions that provide tensors that are shown to have sufficiently strong relationship with each other, specifically with the known assay values of the target mineral type. In other words, the system has identified sub-regions in the initial input region 310 having geological information that is particularly relevant to determining the output of the prediction model 150, i.e., the average grade of an ore of the target mineral type at a target region.

As illustrated, much of the geological information encompassed in the initial input region 310 has very little relationship with the output of the prediction model. The system 100 may therefore, improve the performance of the prediction model 150 by defining a modified input region 320 that excludes at least some of the irrelevant geological information. Furthermore, the system 100 is configured to identify a trend in the geological information to see where outside of the initial input region 310 is likely to have more relevant geological information. Based on the result of the analysis of FIG. 3b, the system 100 is able determine a trend to the right of the initial input region 310.

FIG. 3c illustrates a modified input region that that the system identifies based on the result of the analysis. As illustrated, the system 100 identifies a modified input region 320 that includes additional area or volume at the right of the initial input region 310 but excludes areas or volumes at the top and bottom of the initial input region 310. By using the modified input region 320 instead of the initial input region 310, the ore content prediction system 100 may improve its efficiency by including more relevant data while excluding the data that is likely to be irrelevant.

In some embodiments, the system 100 performs further training of the prediction model 150 based on the modified input region 320. In some embodiments, the system 100 provides the modified input region 320 as a suggestion to the user in a 3D presentation so to help the user improve the performance of the system 100.

Figure 4:
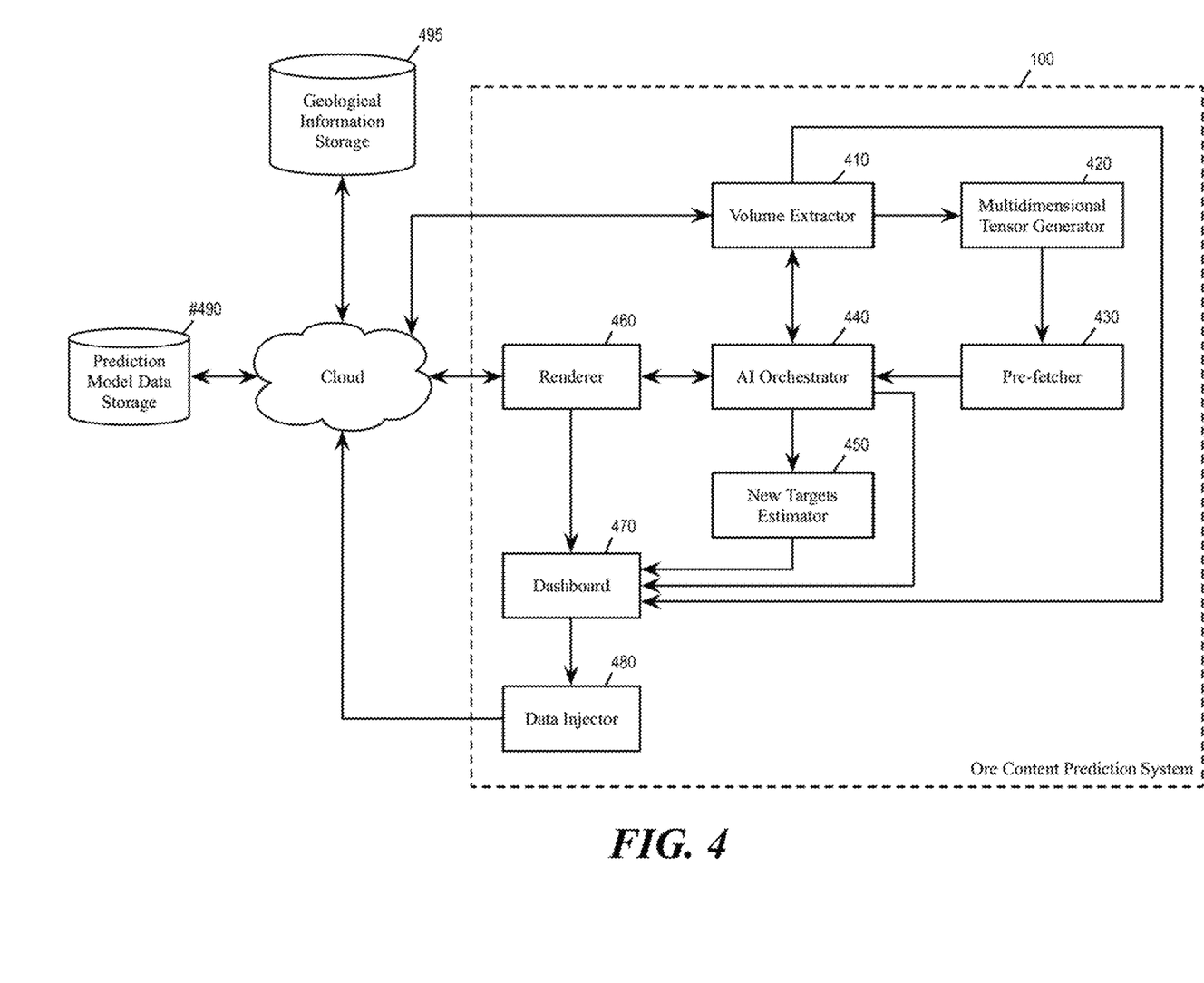
FIG. 4 illustrates a block diagram showing components of the ore content prediction system.

FIG. 4 illustrates a block diagram showing components of the ore content prediction system 100. The ore content prediction system 100 includes a volume extractor 410, a multidimensional tensor generator 420, a prefetcher 430, an artificial intelligence (AI) orchestrator 440, a new targets estimator 450, a renderer 460, a dashboard 470, and a data injector 480. In some embodiments, the components 410-470 are modules of software instructions being executed by one or more processing units (e.g., a processor) of a computing device. In some embodiments, the components 410-480 are modules of hardware circuits implemented by one or more integrated circuits (ICs) of an electronic apparatus. Though the components 410, 420, 430, 440, 450, 460, 470, and 480 are illustrated as being separate modules, some of the modules can be combined into a single module. An example computing device 700 that may implement the ore content prediction system 100 will be described by reference to FIG. 7 below.

The ore content prediction system 100 receives the spatial geological information 200 from a geological information storage 495, which may be over the cloud. The volume extractor 410 examines the spatial geological information 200 and determines an initial target region and a corresponding input region. The volume extractor 410 also provide the spatial geological information that falls within the input region to the multidimensional tensor generator 420.

The multidimensional tensor generator 420 (e.g., the multidimensional tensor generator 130) converts the spatial geological information of the input region into structured geological data (e.g., structure geological data 140) that includes multidimensional tensors for each sub-regions of the input radon.

The AI orchestrator 440 operates the prediction model 150. The AI orchestrator may retrieve the parameters of a previously trained prediction model over the cloud from a prediction model data storage 490. The AI orchestrator may also store the parameter of the prediction model to the prediction model data storage 490 over the cloud. The prefetcher 430 fetches multidimensional tensors from the structured geological data for the AI orchestrator 440 as input or training examples for the prediction model 150 (not illustrated). The AI orchestrator 440 may apply the training examples to train the prediction model 150. The AI orchestrator may also apply the trained prediction model to the input data provided by the prefetcher 430 to produce a prediction output value. The prediction output value is provided to the new targets estimator 450 to produce a prediction of the ore content, specifically for the target region provided by the volume extractor 410. The parameters of the trained prediction model 150 are stored in the cloud and can be retrieved from the cloud. During training of the prediction model 150, the volume extractor 410 may use a set of preliminary training result from the AI orchestrator 440 to identify sub-regions having relevant geological information and to propose modification to the input region in order to improve the performance of the prediction model 150.

The renderer 460 renders various 3D objects for display in a 3D manner, such as the input region and the target region. The renderer may also render an input region for display after it has been modified. The renderer 460 may also project various geological information or structured geometric data at the rendered 3D objects for display.

The dashboard 470 collects the output from various components of the system 100 such as the volume extractor 410, the AI orchestrator 440, and the new target estimator 450. The collected data is then presented to the user on a display or transmitted to the cloud by the data injector 480. The dashboard 470 also receives any rendered object from the renderer 460 for display at the system or over the cloud. The dashboard may also receive input from the user. The user may use the dashboard 470 to select a target region when training the prediction model to estimate ore content for a particular mineral type. The user may also use the dashboard to specify an inquiry region when using the prediction model to predict the grade of the ore content at the selected target region.

Figure 5:
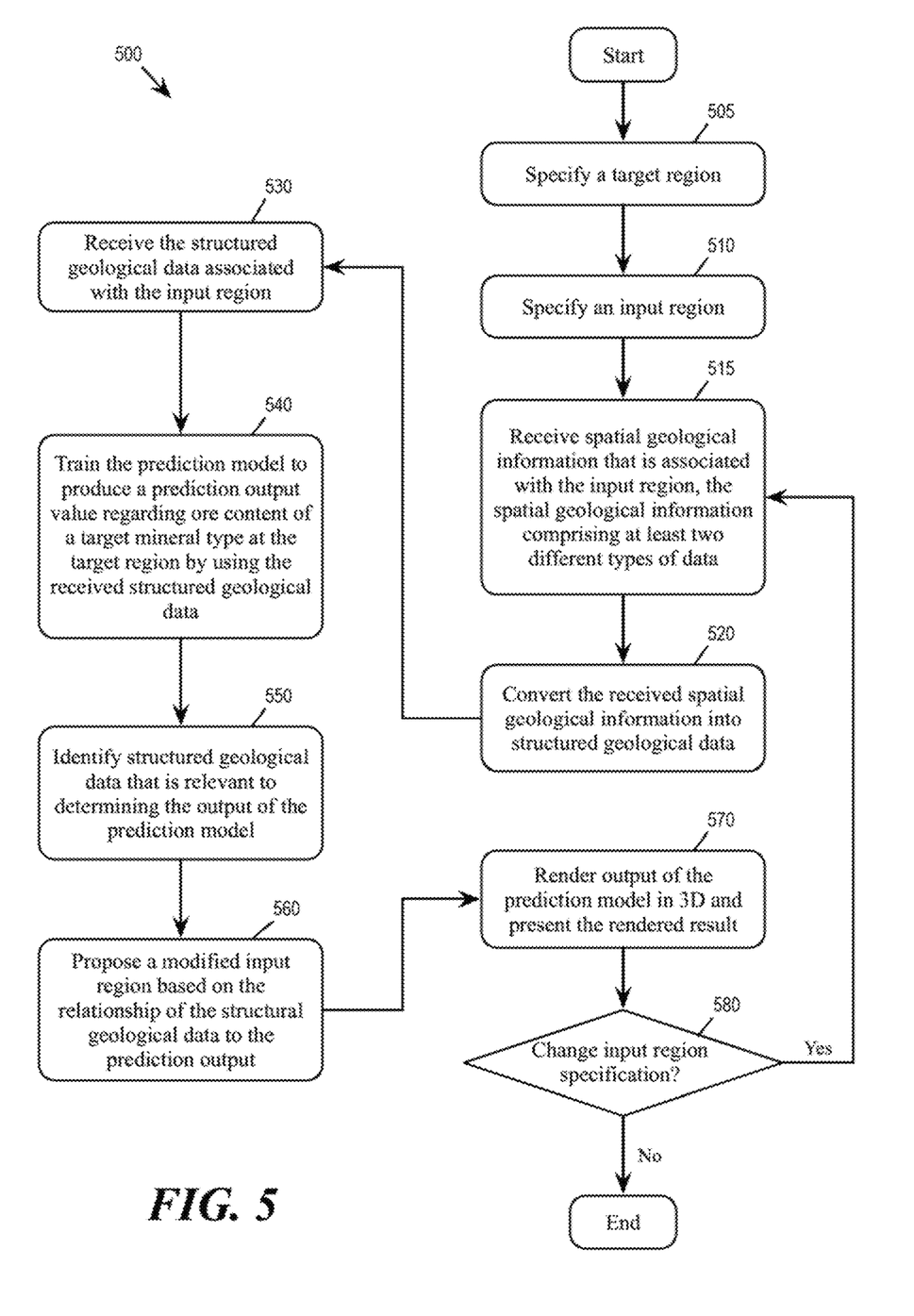
FIG. 5 conceptually illustrates a process for training the prediction model to predict ore content at a target region, consistent with an exemplary embodiment.

FIG. 5 conceptually illustrates a process 500 for training the prediction model to predict ore content at a target region, consistent with an exemplary embodiment. The ore content prediction system 100 may perform the process 500 when the system uses spatial geological information gathered from the mining location 105 to train the prediction model 150. In some embodiments, one or more processing units (e.g., processor) of a computing device implementing the ore content prediction system 100 perform the process 500 by executing instructions stored in a computer readable medium.

The system 100 starts the process 500 by specifying (at 505) a target region for core content prediction. The system may receive the target region specification from the user through a user interface. The system may also receive a target mineral type specification from the user, and in turn specify a target region at or near positions of the mining location with known assay values of the target mineral type. The system then specifies (at 510) an input region that surrounds the specified target region. The system may specify the input region to have a default shape and a default size prior to training the prediction model 150 (e.g., the initial input region 310).

The system receives (at 515) spatial geological information that are associated with (e.g., fall within) the input region. The spatial geological information includes multiple different types of data, such as lithology, veining, alteration and structure information (such as faults and folds), known ore assay values, or other information that is obtained from drill holes and drift maps within the input, region. The system may receive the spatial geological information by retrieving the information from the cloud.

The system converts (at 520) the received spatial geological information into structured geological data, e.g., by converting the spatial geological information into multidimensional tensors. In some embodiments, the system divides the input region into smaller sub-regions and convert the spatial geological information that falls within each smaller sub-region into a multidimensional tensor.

The system receives (at 530) the structured geological data associated with the input region. The system trains (at 540) the prediction model to, produce a prediction output value regarding the core content of the target mineral type at the target region. The prediction output value may reflect the average grade of the ore of the target mineral type in the target region, or a probability of an ore of the target mineral type can be discovered at the target region. Training examples are constructed from input-output pairs that include known assay values of the targeted mineral type.

The system identifies (at 550) the relationship of the structured geological data to the prediction output of the prediction model. The training of the prediction model is an analysis that reveals relationships between the structured geometric data, including the relationship between various geological information with the known assay values of the targeted mineral. The system may therefore identify sub-regions in the input region that have geological information that are particularly relevant to determining the output of the prediction model.

The system proposes (at 560) a modified input region based on the relationship of the structural geological data to the prediction output, e.g., by eliminating portions of the input region that offers no relevant geological information and/or by adding a region that may offer additional relevant geological information. The proposed modification to the input region is made to the user through a display. The system also renders (at 570) the output of the prediction model in 3D and presents the rendered result to the user through a display.

The system determines (at 580) whether to change the input region by e.g., prompting the user whether to adopt the modified input region proposed by the system. If the user, decides to adopt the modified input region, the process proceeds to 515 to receive spatial geological information that fall within the modified input region and to train the prediction model based on the modified input region. If the user decides not to change the input region, the process 500 ends and the system may continue to train the prediction model based on the geological information in the existing input region.

Figure 6:
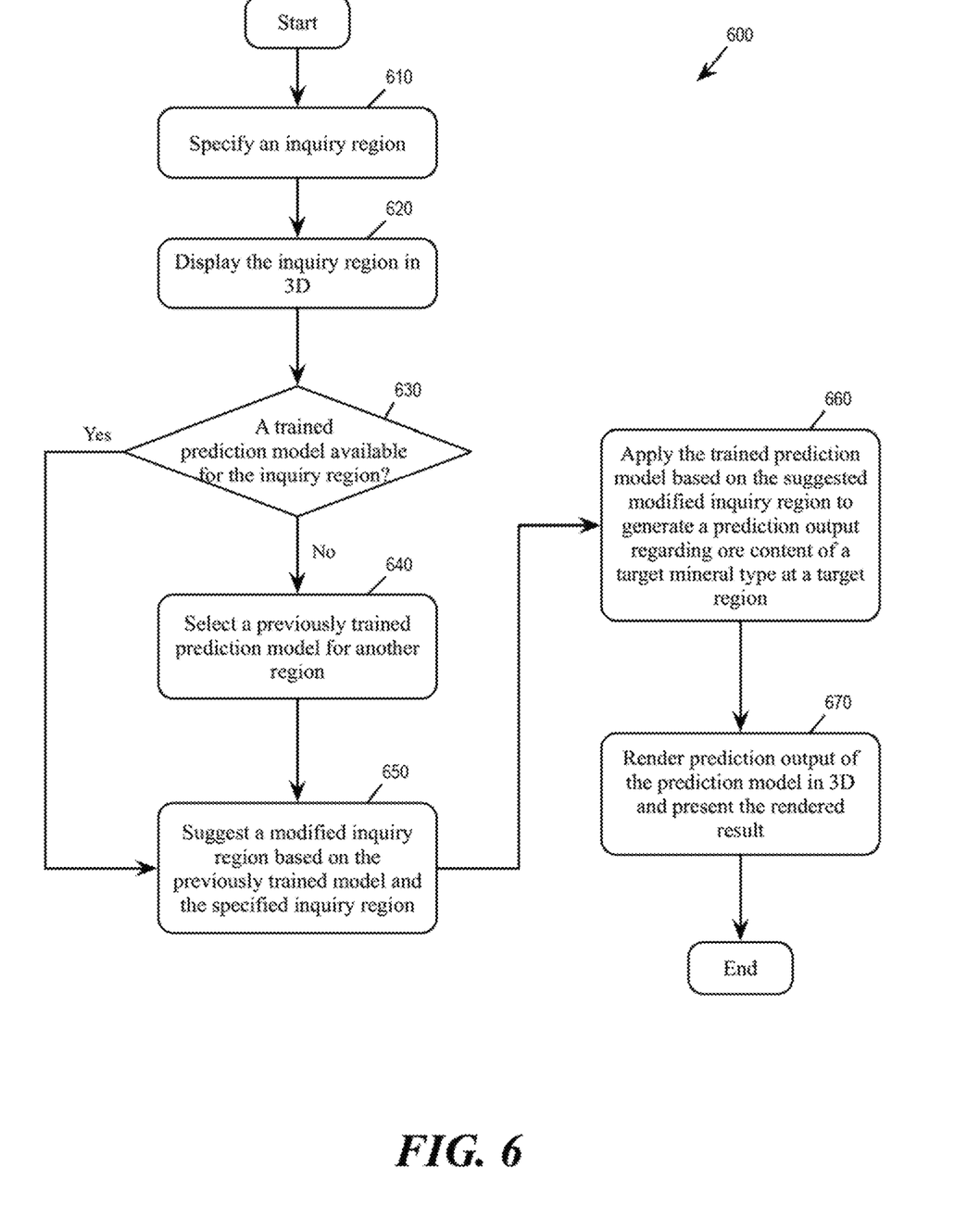
FIG. 6 conceptually illustrates a process for using the prediction model to predict ore content at a target region, consistent with an exemplary embodiment.

FIG. 6 conceptually illustrates a process 600 for using the prediction model to predict ore content at a target region, consistent with an exemplary embodiment. The ore content prediction system 100 may perform the process 600 when the system uses the prediction model to predict the ore content at a target region in the mining location. In some embodiments, one or more processing units (e.g., processor) of a computing device implementing the ore content prediction system 100 perform the process 600 by executing instructions stored in a computer readable medium.

The process 600 starts When the system 100 specifics (at 610) an inquiry region. The inquiry region indicates a region in the mining location that is of interest to the user of the system. Furthermore, geological information that fails within the inquiry region will be used as input to the prediction model to predict the ore content at a target region within the inquiry region. The user may specify the inquiry region through a user interface at the system 100 or through the cloud. The system may also receive a target mineral type specification from the user. The system also displays (at 620) the inquiry region in 3D over a map of the mining location after rendering. The system determines (at 630) whether a trained prediction model is available for the inquiry region. if a trained prediction model is available for the inquiry region, the process proceeds to 650. If the trained prediction model is not available for the inquiry region, the process proceeds to 640.

The system selects (at 640) a previously trained prediction model for another region of the mining location. The system may receive this selection from the user through the user interface of the system. The system may also propose a previously trained prediction model based on similarity or proximity to the specified inquiry region.

The system suggests (at 650) a modified inquiry region based on the selected previously trained model. As mentioned, in the process of training a prediction model, the system may identify regions where spatial geological information is less relevant to the prediction output and regions where spatial geological information is more relevant to the prediction output. The system may suggest a modification to the inquiry region such that regions with more relevant geological information are included while the regions with less relevant geological information are excluded.

The system applies (at 660) the trained prediction model based on the suggested modified inquiry region to generate a prediction output value regarding ore content of a target mineral type at a target region within the modified inquiry region. For example, the system may receive structured geological data that is derived based on spatial geological information that falls within the modified inquiry region and apply the trained prediction model to the received structured geological data to generate a prediction output. The prediction output value may reflect the average grade of the ore of the target mineral type in the target region, or a probability of an ore of the target mineral type can be discovered at the target region.

The system also renders (at 670) the output of the prediction model in 3D and presents the rendered result to the user through a display. The process 600 then ends.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (SRAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 5 and 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may, occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
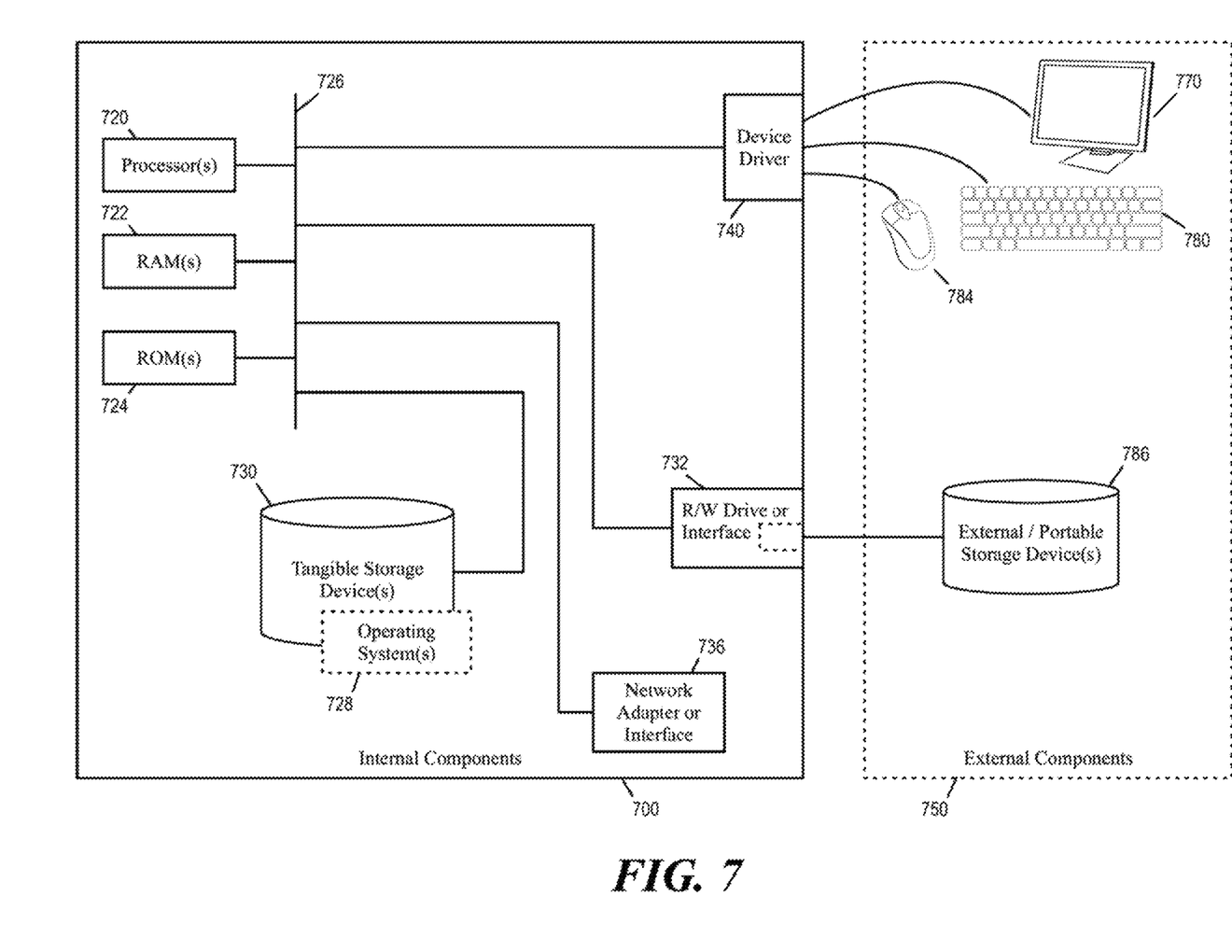
FIG. 7 shows a block diagram of the components of a data processing system in accordance with an illustrative embodiment.

FIG. 7 shows a block diagram of the components of data processing systems 700 and 750 that may be used to implement the ore content prediction system 100 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network. PCs, minicomputer systems, and distributed cloud computing environments that include any of the above systems or devices.

The data processing systems 700 and 750 may include a set of internal components 700 and a set of external components 750 illustrated in FIG. 7. The set of internal components 700 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the processes 500 and 600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal Components 700 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the processes 500 and 600 can be stored on one or more of the respective portable computer-readable tangible storage devices 786, read via the respective R/W drive or interface 732 and loaded into the respective hard drive 730.

The set of internal components 700 may also include network adapters (or switch port cards) or interfaces 736 such as a TCP/IP adapter cards, wireless Wi-Fi interface cards, or 3G or 4G wireless interface cuds or other wired or wireless communication links. Instructions of processes or programs described above can be downloaded from an external computer (e.g., server) via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 750 can include a computer display monitor 770, a keyboard 780, and a computer mouse 784. The set of external components 750 can also include touch screens, virtual keyboards, touch pads, pointing devices, and other human interface devices. The set of internal components 700 also includes device drivers 740 to interface to computer display monitor 770, keyboard 780 and computer mouse 784. The device drivers 740, R/W drive or interface 73, and network adapter or interface 736 comprise hardware and software (stored in storage device 730 and/or ROM 724).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision, processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 8:
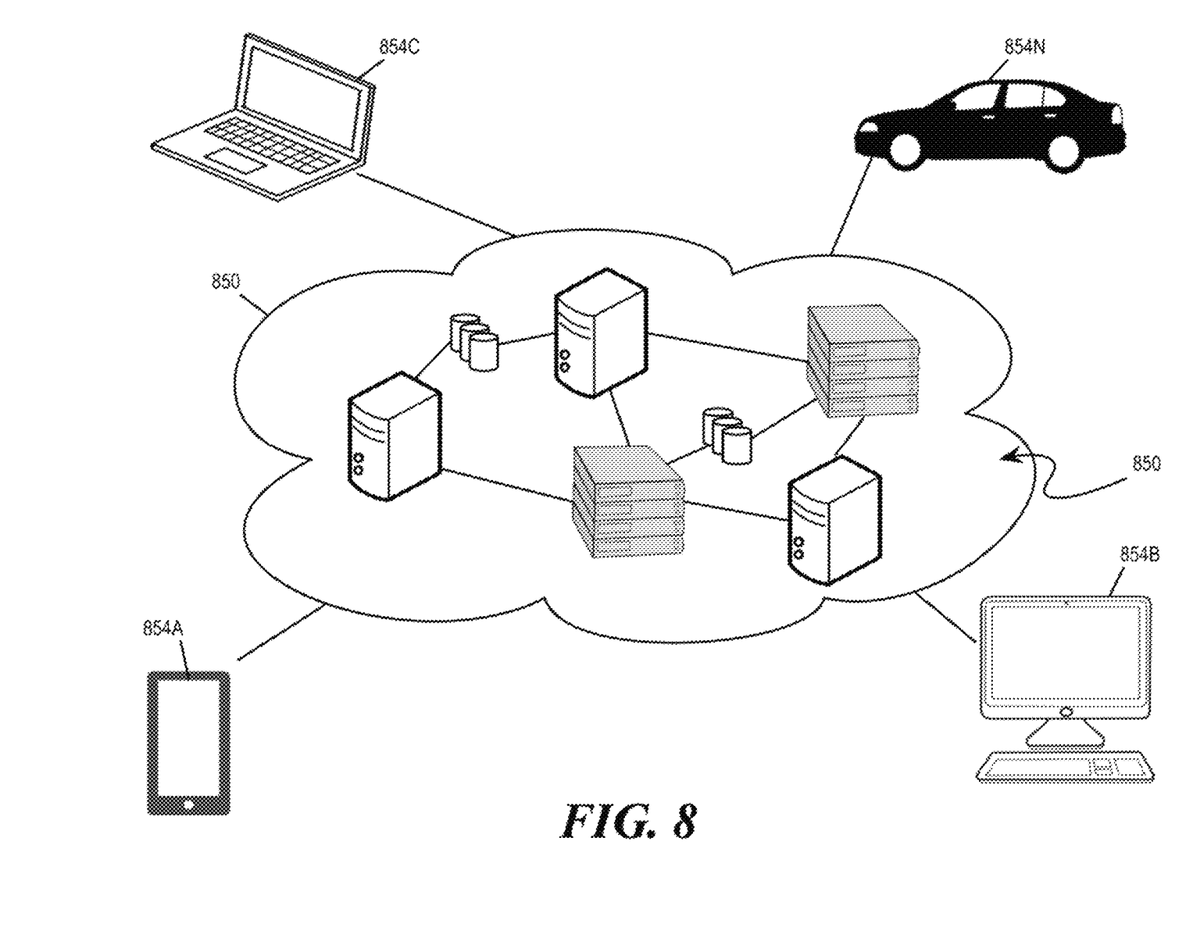
FIG. 8 depicts an example cloud computing environment.

Referring now to FIG. 8, an illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or More networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
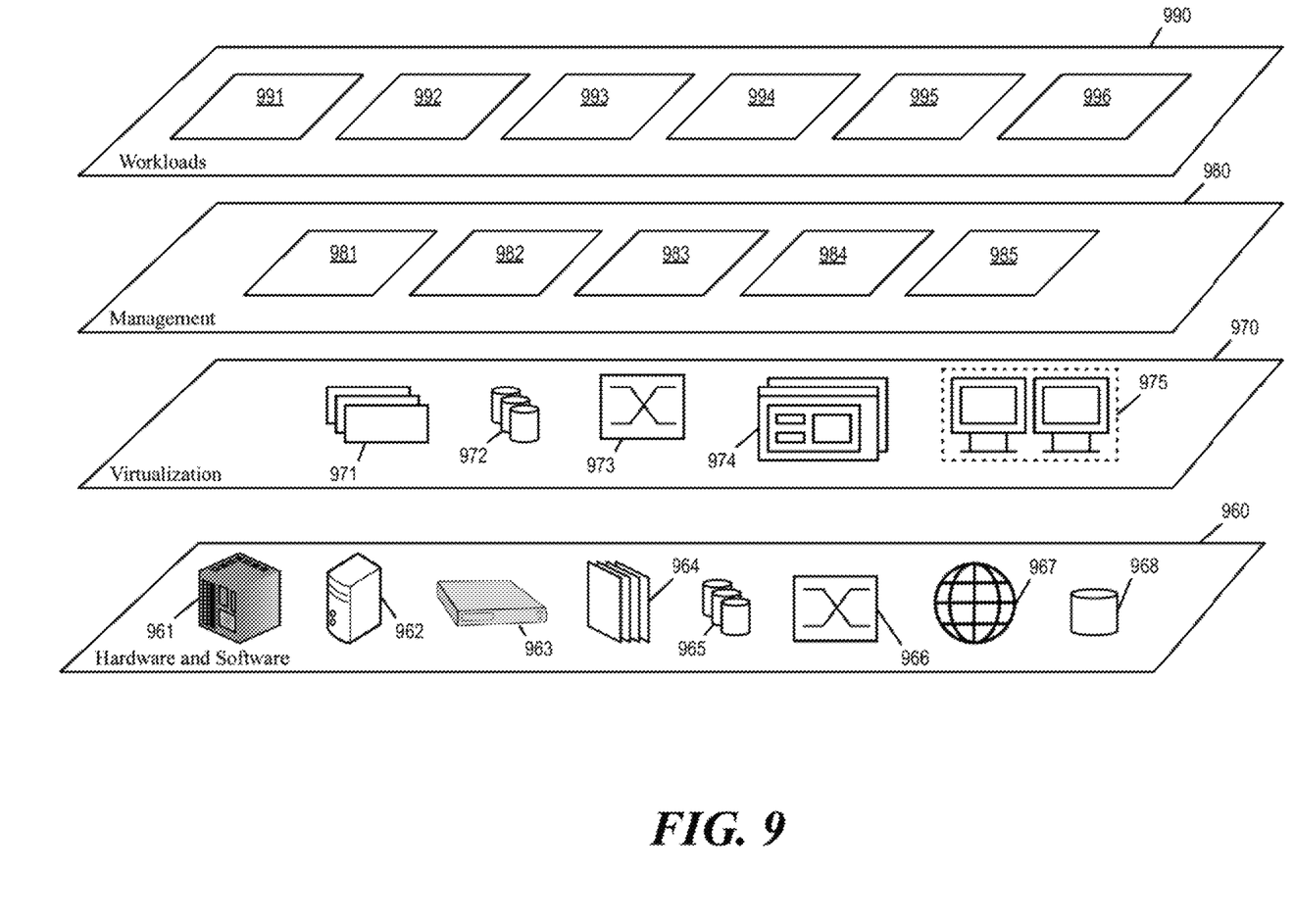
FIG. 9 illustrates a set of functional abstraction layers provided by cloud computing environment.

Referring now to FIG. 9, a set of functional abstraction layers provided by cloud computing environment 850 (of FIG. 8) is shown. It should be understood that the components, layers, and functions shown in FIG. 9 are intended to be illustrative only and embodiments of the disclosure are not limited thereto. As depicted, the following layers and corresponding functions are provided:

Hardware and software layer 960 include hardware and software components. Examples of hardware components include: mainframes 961; RISC (Reduced Instruction Set Computer) architecture based servers 962; servers 963; blade servers 964; storage devices 965; and networks and networking components 965. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud-computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and mass information storage 996. In some embodiments, the mass information storage 996 provide data storage to some of the operations of the ore content prediction system 100, including the geological information storage 495 and the prediction model data storage 490.

The foregoing one or more embodiments implements ore content prediction system within a computer infrastructure by having one or more computing devices processing geological information of an input region or inquiry region to predict ore content of a target mineral type at a target region. The computer infrastructure further uses the processed geological information to train a prediction model and to suggest a modified input or inquiry region.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a network interface;
a processor; and
a storage device storing a set of instructions, wherein an execution of the set of instructions by the processor configures the computing device to perform acts comprising:
receiving structured geological data that is derived based on spatial geological information that is converted into tensors and associated with an input region, the spatial geological information comprising one or more different types of data;
training a prediction model to produce a prediction output based on an average grade of an ore of a target mineral type at a target region nested in the input region, by using the tensors of the received structured geological data of the input region, wherein the use of tensors improves the time efficiency of the training of the prediction model;
identifying a relationship of the structured geological data to the prediction output; and
determining a revised input region based on the identified relationship without changing the target region.

2. The computing device of claim 1, wherein the execution of the set of instructions further configures the computing device to perform acts comprising:
specifying an inquiry region;
receiving structured geological data that is derived based on spatial geological information that is associated with the inquiry region; and
applying the trained prediction model to the received structured geological data to generate a prediction output based on an average grade of an ore of the target mineral type at a target region within the inquiry region.

3. The computing device of claim 1, wherein the execution of the set of instructions further configures the computing device to perform acts comprising:
specifying an inquiry region;
suggesting a modified inquiry region based on the trained prediction model and the specified inquiry region;
receiving structured geological data that is derived based on spatial geological information that falls within the modified inquiry region; and
applying the trained prediction model to the received structured geological data to generate a prediction output based on an average grade of an ore of the target mineral type at a target region within the modified inquiry region.

4. The computing device of claim 1, wherein the spatial geological information from the input region comprises at least two of: lithology, veining, ore assay values, and structure information of the input region.

5. The computing device of claim 1, wherein the received structured geological data comprises a plurality of multidimensional tensors that are derived from spatial geological information of a plurality of sub-regions of the input region.

6. The computing device of claim 1, wherein the prediction model comprises a convolutional neural network.

7. The computing device of claim 1, wherein training the prediction model comprises providing structured geological data that is derived from different sub-regions of the input region to the prediction model.

8. A computer-implemented method comprising:
receiving structured geological data that is derived based on spatial geological information that is converted into tensors and associated with an input region, the spatial geological information comprising one or more different types of data;
training a prediction model to produce a prediction output based on an average grade of an ore of a target mineral type at a target region nested in the input region by using the tensors of the received structured geological data of the input region, wherein the use of tensors improves the time efficiency of the training of the prediction model;
identifying a relationship of the structured geological data to the prediction output; and
determining a revised input region based on the identified relationship without changing the target region.

9. The computer-implemented method of claim 8, further comprising:
specifying an inquiry region;
receiving structured geological data that is derived based on, spatial geological information that is associated with the inquiry region; and
applying the trained prediction model to the received structured geological data to generate a prediction output based on an average grade of an ore of the, target, mineral type at a target region within the inquiry region.

10. The computer-implemented method of claim 8, further comprising:
specifying an inquiry region;
suggesting a modified inquiry region based on the trained prediction model and the specified inquiry region;
receiving structured geological data that is derived based on spatial geological information that is associated with the modified inquiry region; and
applying the trained prediction model to the received structured geological data to generate a prediction output based on an average grade of an ore of the target mineral type at a target region within the modified inquiry region.

11. The computer-implemented method of claim 8, wherein the spatial geological information from the input region comprises at least two of: lithology, veining, ore assay values, and structure information of the input region.

12. The computer-implemented method of claim 8, wherein the received structured geological data comprises a plurality of multidimensional tensors that are derived from spatial geological information of a plurality of sub-regions of the input region.

13. The computer-implemented method of claim 8, wherein the prediction model comprises a convolutional neural network.

14. The computer-implemented method of claim 8, wherein training the prediction model comprises providing structured geological data that is derived from different sub-regions of the input region to the prediction model.

15. A computer program product comprising:
one or more non-transitory computer-readable storage device and program instructions stored on at least one of the one or more non-transitory storage devices, the program instructions executable by a processor, the program instructions comprising sets of instructions for:
receiving structured geological data that is derived based on spatial geological information that is converted into tensors and associated with an input region, the spatial geological information comprising one or more different types of data;
training a prediction model to produce a prediction output based on an average grade of an ore of a target mineral type at a target region nested in the input region, by using the tensors of the received structured geological data of the input region, wherein the use of tensors improves the time efficiency of the training of the prediction model;
identifying a relationship of the structured geological data to the prediction output; and
determining a revised input region based on the identified relationship without changing the target region.

16. The computer program product of claim 15, wherein the program instructions further comprise sets of instructions for:
specifying an inquiry region;
receiving structured geological data that is derived based on spatial geological information that associated with the inquiry region; and
applying the trained prediction model to the received structured geological data to generate a prediction output based on an average grade of an ore of the target mineral type at a target region within the inquiry region.

17. The computer program product of claim 15, wherein the program instructions further comprise sets of instructions for:
specifying an inquiry region;
suggest a modified inquiry region based on the trained prediction model and the specified inquiry region;
receiving structured geological data that are derived based on spatial geological information that is associated with the modified inquiry region; and
applying the trained prediction model to the received structured geological data to generate a prediction output based on an average grade of an ore of the target mineral type at a target region within the modified inquiry region.

18. The computer program product of claim 15, wherein the spatial geological information from the input region comprises at least two of: lithology, veining, ore assay values, and structure information of the input region.

19. The computer program product of claim 15, wherein the received structured geological data comprises a plurality of multidimensional tensors that are derived from spatial geological information of a plurality of sub-regions of the input region.

20. The computer program product of claim 15, wherein the prediction model comprises a convolutional neural network.

* * * * *